Patented Aug. 26, 1947

2,426,486

UNITED STATES PATENT OFFICE 2,426,486

STABILIZATION OF FATTY MATERIALS

Loran O. Buxton, Newark, and Charles E. Dryden, East Orange, N. J., assignors to Nopco Chemical Company, Harrison, N. J., a corporation of New Jersey No Drawing. Application March 27, 1944, Serial No. 528,355

15 Claims. (Cl. 167—81)

The present invention relates to the stabilization of fatty materials. More particularly, the present invention relates to a process for refining and stabilizing fatty materials of marine origin containing vitamins A and D.

As pointed out in application Serial No. 375,255, filed January 21, 1941, and entitled "Process for refining fatty materials," now Patent No. 2,345,577, vitamin-containing oils such as fish liver oils can be improved as to physical characteristics and stabilized as to vitamins A and D by contacting the same with vegetable meals in the presence of a solvent for the oil, and preferably a small percentage of a lower aliphatic monocarboxylic acid.

It has now been discovered that fatty materials of the nature of fish liver oils can be effectively treated with results favorably comparing with those achieved by the practice of the aforementioned process by contacting the fish liver oils with a vegetable meal and ammonia. Preferably, there is also present an organic solvent for the oil of the same nature as that disclosed in the aforementioned copending application.

It is one of the objects of the present invention, therefore, to improve the physical characteristics, i. e., odor, taste, etc. of fatty compounds, while at the same time stabilizing the vitamin A and D content thereof, by treating such fatty compounds and/or oils with a small percentage of ammonia.

A further object of the present invention is to contact a fatty material of marine origin containing vitamins A and D with vegetable meals in the presence of an organic solvent for the oil, and a small percentage, for example from about 1 to 20%, of ammonia.

Still another object of the present invention is to stabilize a fatty material of marine origin containing vitamins A and D, as for example fish liver oils, against oxidation by contacting the fatty material with a new antioxidant produced in situ in vegetable meals by the action of ammonia.

Other objects and advantages of the present invention will become apparent from the subsequent specification and specific examples.

Although in the process as practiced in accordance with application Serial No. 375,255 a stabilized form of fish liver oil or fatty material is produced, certain difficulties have been encountered in separating the lower aliphatic monocarboxylic acid, as for example acetic acid, from the fish liver oil. As can be understood, the type of organic solvent used is relatively easy to separate from the oil due to its low boiling point. A lower aliphatic monocarboxylic acid such as acetic acid has a relatively high boiling point, and the separation thereof from the fish liver oil necessarily involves heating the oil to a relatively high temperature. When ammonia is used in accordance with the present invention, this problem is not encountered; the ammonia is volatilized by a relatively simple and low temperature heating step. So far as can be ascertained, the ammonia reacts with the natural antioxidants contained in the vegetable meals to produce new antioxidants in situ of a greatly enhanced antioxidant value and oil solubility. Although, as previously stated, it is preferred to use a solvent for the oil in the process, it is not entirely necessary to use such a solvent where ammonia is used, because of the aforementioned increased oil solubility of the new antioxidants produced in the vegetable meals. The ammonia apparently does not react with either the glyceride portion of the fish liver oils being treated or with the glyceride portion of the oils in the vegetable meal, since tests made before and after ammonia treatment have indicated no change in the physical or chemical constants of the fish liver oil or of the mixture of the meal and fish liver oil.

The fatty materials which may be treated in accordance with this invention may be any such material to which it is desired to impart increased stability. The invention is particularly applicable to the treatment of vitamin A or D containing materials containing one or both of these vitamins in the alcohol or ester form. Thus, for example, fish liver oils such as cod liver oil, shark liver oil, sword fish liver oil, ling cod liver oil, tuna liver oil, halibut liver oil and the like may all be treated, as well as vitamin concentrates prepared from such fish liver oils by saponification of the oils and extraction of the unsaponifiable fraction therefrom. Furthermore, highly potent products prepared by high vacuum distillation of the fish liver oils may be treated with advantage; other highly potent products prepared by solvent extraction of the fish liver oils or by similar methods designed to produce a fraction having the vitamin potency concentrated therein may also be treated. However, other fatty materials capable of being improved by treatment with vegetable meals may also be processed; for example, this invention may be applied to the refining of cottonseed oil, soybean oil, peanut oil, sesame oil, lard and similar products.

Any vegetable meal may be employed in the practice of this invention, particularly those rich in natural antioxidants; thus, for example, cottonseed meal, soybean meal, sesame meal, corn meal, corn germ meal, wheat germ meal, alfalfa leaf meal, peanut meal, rice bran, rye, barley, and other vegetable meals known to the art may be employed. These meals may be prepared by either cold pressing or expelling oil from the vegetable and grinding, or by extracting the oil from the vegetable with a solvent and grinding. Preferably, however, a meal having a low oil content prepared by cold pressing or expelling oil from the vegetable meal is employed. If desired, an adsorbent, such as activated carbon or an activated earth, may be added to the meal in order to assist in the removal of the objectionable odor, taste and color-forming constituents. It is advantageous to substantially completely deaerate the meal before it is employed in the practice of my invention in order to minimize oxidation of the vitamins during the refining process; this deaeration may be advantageously carried out by agitating the meal with the solvent to be employed until the entrapped air has been driven from the meal.

The solvent employed in the practice of this invention should be one in which the fatty material to be refined is readily soluble. Thus if a fish liver oil or concentrate prepared therefrom is being treated, a hydrocarbon or halogenated hydrocarbon solvent such as hexane, heptane, octane, ethylene dichloride, trichlorethylene, carbon tetrachloride, cyclohexane, methyl cyclohexane or benzene may be employed as the solvent, as well as solvents such as acetone, isopropanol, diacetone alcohol and the like. In some instances mixtures of the aforementioned solvents may be found desirable for use in the process.

Preferably, the present process is carried out by mixing a vitamin A or D containing material of the characteristic set forth with a solvent mixture, a vegetable meal and a small quantity of concentrated aqueous ammonium hydroxide and then refluxing the mass in an inert atmosphere for a short period in order to release the antioxidants produced in the meal by the ammonia. However, in the event that ammonia gas is used, the process may be carried out in an open vessel equipped with a reflux condenser or in a closed vessel under pressure of the ammonia gas. In this instance, also, the process may be carried out in the absence of an organic solvent. In general, however, the presence of an organic solvent of the character described is preferred, since lower temperatures and shorter times of treatment can be used and better results obtained.

The amount of ammonia used is relatively small as compared to the quantity of fatty material and vegetable meal and may vary from about 1 to 20% by weight of concentrated aqueous ammonia, as compared to the weight of the fatty material, i. e. fish liver oil and the like. When gaseous ammonia or liquid ammonia is used, the amount is equivalent to that just set forth. The amount of vegetable meal may vary substantially but, in general, it is desirable to employ between about 5 parts to 120 parts or more by weight of meal to 100 parts of fatty material. The amount of solvent employed should be at least equivalent to, and preferably somewhat in excess of, the amount of material being refined. The process may be carried out at room temperature, or elevated temperatures may be employed. After the mixture has been thoroughly agitated for between about ½ and about 3 hours, the meal may be removed by filtration and the refined material recovered by evaporation of the solvent.

The following examples serve to illustrate the present invention but are not intended to limit the same.

Example I

A mixture of 30 grams of carbon-refined shark liver oil containing 57,300 units of vitamin A per gram, 30 grams of expeller linseed meal, 190 ml. of acetone and 10 ml. of concentrated ammonium hydroxide were mixed and heated at reflux temperature for 2 hours. Thereafter, the mixture was cooled to room temperature, filtered and the solvent evaporated. The resultant product contained about 53,000 vitamin A units per gram and was improved in taste and odor. The product was then tested for its stability by maintaining it at a temperature of approximately 34.5° C. in the presence of air with the following results:

| Sample | Per Cent Vitamin A Destroyed After— | | | | |
| --- | --- | --- | --- | --- | --- |
|  | 6 days | 14 days | 20 days | 1 mo. | 3 mos. |
| Product of Example I | 0 | 2.65 | 1.13 | 5.3 | 9.42 |
| Original Oil | 18.5 | 52.0 |  |  |  |

Example II

A similar carbon-refined shark liver oil containing 56,500 units of vitamin A per gram was similarly treated with quantities of expeller linseed meal, acetone, and concentrated ammonium hydroxide as set forth in Example I. The following results were obtained.

| Sample | Per Cent Vitamin A Destroyed After— | | | | |
| --- | --- | --- | --- | --- | --- |
|  | 6 days | 14 days | 20 days | 1 mo. | 3 mos. |
| Product of Example II (48,800 units A/gr.) | 0 | 3.28 | 2.66 | 6.15 | 9.4 |
| Original Oil | 27 | 62.5 |  |  |  |

Example III

Thirty grams of a carbon-refined shark liver oil containing 56,500 units of vitamin A per gram were mixed with 30 grams of wheat germ flour, 190 ml. of acetone and 10 ml. of concentrated ammonium hydroxide. The mixture was then refluxed for 2 hours, cooled and filtered. The solvent was thereafter evaporated.

The following results were obtained.

| Sample | Per Cent Vitamin A Destroyed After— | | | | |
| --- | --- | --- | --- | --- | --- |
|  | 6 days | 14 days | 20 days | 27 days | 2 mos. |
| Product of Example III (52,000 units A/gr.) | 0.385 | 2.77 | 3.08 | 5.2 | 9.24 |
| Original Oil | 27 | 62.5 |  |  |  |

Example IV

Thirty grams of a carbon-refined shark liver oil containing 56,500 units of vitamin A per gram were mixed with 30 grams of wheat germ flour, 100 ml. of acetone, 90 ml. of methanol, and 10 ml. of concentrated ammonium hydroxide. The mixture was then refluxed for 2 hours, cooled and filtered. The solvent was thereafter evaporated. The specific value of the product was 49,200 units of vitamin A per gram. The following results were obtained:

| Sample | Per Cent Vitamin A Destroyed After— | | | |
|---|---|---|---|---|
| | 6 days | 14 days | 20 days | 31 days |
| Product of Example IV (49,200 units A/gr.) | 0 | 1.02 | 0.47 | 3.5 |
| Original Oil | 27 | 62.5 | | |

Example V

Thirty grams of a carbon-refined shark liver oil and 30 grams of expeller linseed meal were thoroughly admixed and thereafter 10 ml. of concentrated ammonia were added. The entire mass was then agitated intermittently over a period of 2 hours. Thereafter the mass was heated slowly while subjected to a stream of nitrogen to expel the ammonia. The oil was then separated from the meal by dissolving the same in a small amount of acetone and filtering. The resultant product was substantially improved in stability.

It will be noted from the above examples that the fish liver oils treated have been greatly improved as to vitamin A stability. Similar results can be obtained by utilizing other solvents of the character previously set forth and ammonia in other forms. It is desired to point out, therefore, that when in the appended claims the term "ammonia" is used, liquid or gaseous ammonia, and ammonia dissolved in water or other suitable solvent therefor is intended.

Having described our invention, what we claim as new and desire to secure by Letters Patent is:

1. A process for stabilizing a fatty material comprising contacting the fatty material with a vegetable meal in the presence of a relatively small amount of ammonia.

2. A process for stabilizing a vitamin-containing fatty material of marine origin comprising contacting said fatty material with a vegetable meal in the presence of a relatively small amount of ammonia.

3. A process for stabilizing a fatty material comprising contacting said fatty material with a vegetable meal in the presence of a relatively small amount of ammonia and heating the meal, fatty material and ammonia.

4. A process for stabilizing a fatty material comprising contacting said fatty material with a vegetable meal in the presence of a solvent for the fatty material and a relatively small amount of ammonia.

5. A process for stabilizing a vitamin-containing fatty material of marine origin comprising contacting said fatty material with a vegetable meal in the presence of a solvent for the fatty material and a relatively small amount of ammonia.

6. A process for stabilizing a vitamin-containing fatty material of marine origin comprising contacting said fatty material with a vegetable meal in the presence of a solvent for the fatty material and from about 1 to 20% of ammonia.

7. A process for stabilizing a fish liver oil comprising contacting the fish liver oil with a vegetable meal in the presence of a relatively small amount of ammonia.

8. A process for stabilizing a fish liver oil comprising contacting said fish liver oil with a vegetable meal in the presence of a solvent for the fish liver oil and from about 1 to 20% of ammonia.

9. A process for stabilizing a fish liver oil comprising contacting said fish liver oil with a vegetable meal in the presence of acetone and from about 1 to 20% of ammonia.

10. A process for refining a fish liver oil comprising contacting said fish liver oil with a vegetable meal in the presence of acetone and from 1 to 20% of a concentrated aqueous solution of ammonia.

11. A process for stabilizing a fatty material comprising contacting said fatty material with a vegetable meal in the presence of a solvent for the fatty material and a relatively small amount of ammonia and thereafter refluxing the fatty material, meal, solvent, and ammonia mixture.

12. A process for stabilizing a vitamin-containing fatty material of marine origin comprising contacting said fatty material with a vegetable meal in the presence of a solvent for the fatty material and a relatively small amount of ammonia, refluxing the mixture of fatty material, meal, solvent, and ammonia, separating the meal from the fatty material and solvent and thereafter removing the solvent and excess ammonia.

13. A process for stabilizing a vitamin-containing fatty material of marine origin comprising contacting said fatty material with a vegetable meal in the presence of acetone and a relatively small amount of ammonia, refluxing the mixture of fatty material, meal, acetone, and ammonia, separating the meal from the fatty material and acetone and thereafter removing the acetone and excess ammonia.

14. A stabilized vitamin-containing fatty material of marine origin obtained by the process defined in claim 12.

15. A stabilized vitamin-containing fatty material of marine origin obtained by the process defined in claim 13.

LORAN O. BUXTON.
CHARLES E. DRYDEN.

REFERENCES CITED

The following references are of record in the file of this patent:

UNITED STATES PATENTS

| Number | Name | Date |
|---|---|---|
| 2,345,577 | Buxton | Apr. 4, 1944 |

OTHER REFERENCES

Pharmaceutical Abstracts of the Journal of the American Pharmaceutical Association, vol. 1, page 116 (1935).